United States Patent
McCarthy et al.

(10) Patent No.: US 10,889,164 B2
(45) Date of Patent: Jan. 12, 2021

(54) FLOW HEATER

(71) Applicant: BorgWarner Ludwigsburg GmbH, Ludwigsburg (DE)

(72) Inventors: Cian McCarthy, Dingle (IE); Stephen Sweeney, Tralee (IE); Dara O'Carroll, Tralee (IE); Hermida Xoan, Gondomar (ES)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 207 days.

(21) Appl. No.: 16/126,587

(22) Filed: Sep. 10, 2018

(65) Prior Publication Data
US 2019/0077224 A1 Mar. 14, 2019

(30) Foreign Application Priority Data
Sep. 14, 2017 (DE) .......................... 10 2017 121 341

(51) Int. Cl.
| | | |
|---|---|---|
| *F24H 1/10* | (2006.01) | |
| *F24H 9/12* | (2006.01) | |
| *B60H 1/22* | (2006.01) | |
| *H05B 3/26* | (2006.01) | |
| *F24H 1/00* | (2006.01) | |

(Continued)

(52) U.S. Cl.
CPC .......... *B60H 1/2221* (2013.01); *F24H 1/009* (2013.01); *F24H 1/121* (2013.01); *F24H 9/1827* (2013.01); *H05B 3/141* (2013.01); *H05B 3/24* (2013.01); *H05B 3/262* (2013.01); *H05B 3/265* (2013.01); *B60H 2001/2271* (2013.01); *F24H 2250/04* (2013.01); *H05B 2203/013* (2013.01)

(58) Field of Classification Search
USPC ......................................................... 392/493
See application file for complete search history.

(56) References Cited

U.S. PATENT DOCUMENTS

| | | | | |
|---|---|---|---|---|
| 1,985,830 | A * | 12/1934 | Hynes | ..................... F24H 1/102 |
| | | | | 392/492 |
| 5,438,642 | A * | 8/1995 | Posen | ..................... F24H 1/102 |
| | | | | 122/19.1 |

(Continued)

FOREIGN PATENT DOCUMENTS

| | | | | |
|---|---|---|---|---|
| CN | 104903658 A * | 9/2015 | ........... F24H 9/1818 |
| DE | 295 15 932 U1 | 2/1996 | |

(Continued)

OTHER PUBLICATIONS

CN-104903658-A, Sep. 2015, Kwon, partial translation (Year: 2015).*

*Primary Examiner* — Joseph M. Pelham
(74) *Attorney, Agent, or Firm* — Bose McKinney & Evans LLP

(57) ABSTRACT

Flow heater comprising a housing having an inlet and an outlet, a plate shaped heating insert that is arranged in the housing and defines a flow path from the inlet to the outlet. According to this disclosure the plate shaped heating insert comprises a first heating plate, a second heating plate, and a plate support arranged between the first heating plate and the second heating plate, wherein the first heating plate and the second heating plate are arranged on opposite sides of the plate support, and the first heating plate and the second heating plate each comprise a substrate plate carrying a resistive layer.

9 Claims, 3 Drawing Sheets

(51) Int. Cl.
    *F24H 1/12*     (2006.01)
    *F24H 9/18*     (2006.01)
    *H05B 3/14*     (2006.01)
    *H05B 3/24*     (2006.01)

(56) References Cited

U.S. PATENT DOCUMENTS

| | | | |
|---|---|---|---|
| 8,346,069 B2 * | 1/2013 | Yeung | F24H 1/106 |
| | | | 392/465 |
| 2005/0047768 A1 * | 3/2005 | Kuebler | H05B 3/78 |
| | | | 392/493 |
| 2013/0186966 A1 | 7/2013 | Taguchi | |
| 2014/0348497 A1 | 11/2014 | Giffels et al. | |
| 2015/0131979 A1 | 5/2015 | Kohl et al. | |
| 2016/0069588 A1 | 3/2016 | Kominami et al. | |
| 2016/0360574 A1 | 12/2016 | Bohlender et al. | |

FOREIGN PATENT DOCUMENTS

| | | |
|---|---|---|
| DE | 197 20 880 A1 | 11/1998 |
| DE | 103 40 362 A1 | 3/2005 |
| DE | 10 2011 003 296 A1 | 8/2012 |
| DE | 10 2011 050 992 A1 | 12/2012 |
| DE | 10 2013 105 270 A1 | 11/2014 |
| EP | 2 689 945 A1 | 1/2014 |
| EP | 2 797 382 B1 | 3/2016 |
| EP | 2 734 007 B1 | 9/2016 |

* cited by examiner

FLOW HEATER

RELATED APPLICATIONS

This application claims priority to DE 10 2017 121 341.4, filed Sep. 14, 2017, the entire disclosure of which is hereby incorporated herein by reference.

BACKGROUND

This disclosure relates to a flow heater having an inlet and an outlet of the type generally described in DE 10 2013 105 270 A1.

In such a flow heater a plate-shaped heating insert defines a flow path in a housing by separating the interior of a housing into a part above and a part below the heating insert. Thus, heat is transferred to the liquid via both sides of the plate shaped heating insert.

Flow heaters are needed, e.g., in cars, for heating various liquids, especially water or water-based solutions. Common goals in developing flow heaters for cars involve a compact design, low manufacturing cost and a high efficiency such that a large amount of liquid can be heated in a short time.

SUMMARY

This disclosure teaches a flow heater that meets the above goals to a larger extent.

In a flow heater according to this disclosure, the plate shaped heating insert comprises a first heating plate, a second heating plate, and a plate support arranged between the first heating plate and the second heating plate. Thus both heating plates can be exposed to the liquid to be heated so that an efficient heat transfer can be achieved. The first and the second heating plate are arranged on opposite sides of the plate support. The first and the second heating plate each comprise a substrate plate carrying a resistive layer. This enables a much more compact design than prior art flow heaters comprising PTC blocks arranged between two contact sheets.

The resistive layer may for example be a printed layer or a layer deposited by other means on a substrate, e.g., by vapor deposition. Resistive layers can be provided with a thickness of 0.2 mm or less. Hence, the plate shaped heating insert of this disclosure and the heating plates comprised therein can be very thin.

The substrate may be a ceramic plate, e.g., a plate of alumina or some other electrically insulating ceramic. The substrate may also be electrically conducting, e.g., the substrate may be a metallic sheet, like an aluminum sheet. If the substrate is an electrical conductor, an electrically insulating layer may be provided between the metal sheet and the resistive layer.

In a refinement of this disclosure, the plate support is a frame. A frame can be provided with very little mass so that the weight and thermal capacity of the heating insert is rather small. For example, the frame may have an outline that corresponds to the outline of the heating plates such that rim sections of the heating plates rest on the frame. The outline of the frame may surround an empty space or a space that is intersected by webs. In any case a frame can provide the heating insert with hollow spaces reducing its weight and thermal capacity.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
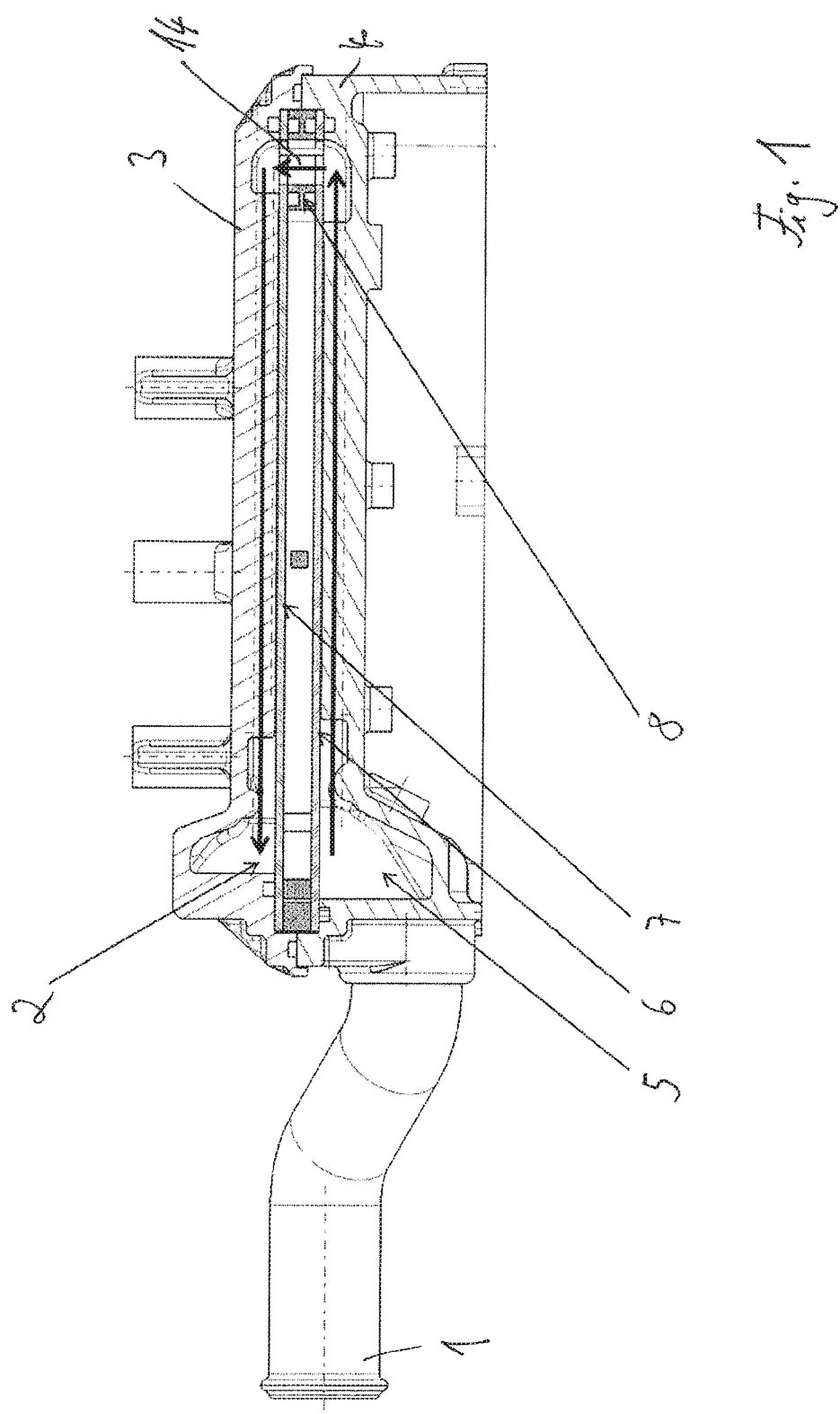
FIG. 1 shows a sectional view of a flow heater.
Figure 3:
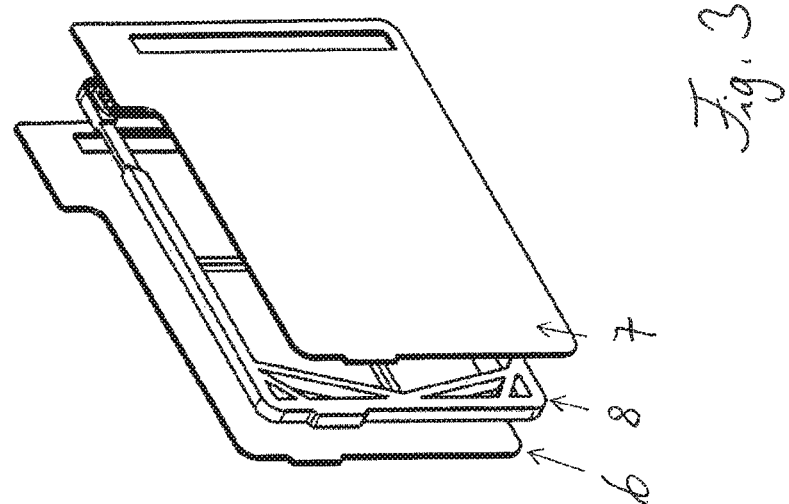
FIG. 3 shows an exploded view of the heating insert of the flow heater.
Figure 2:
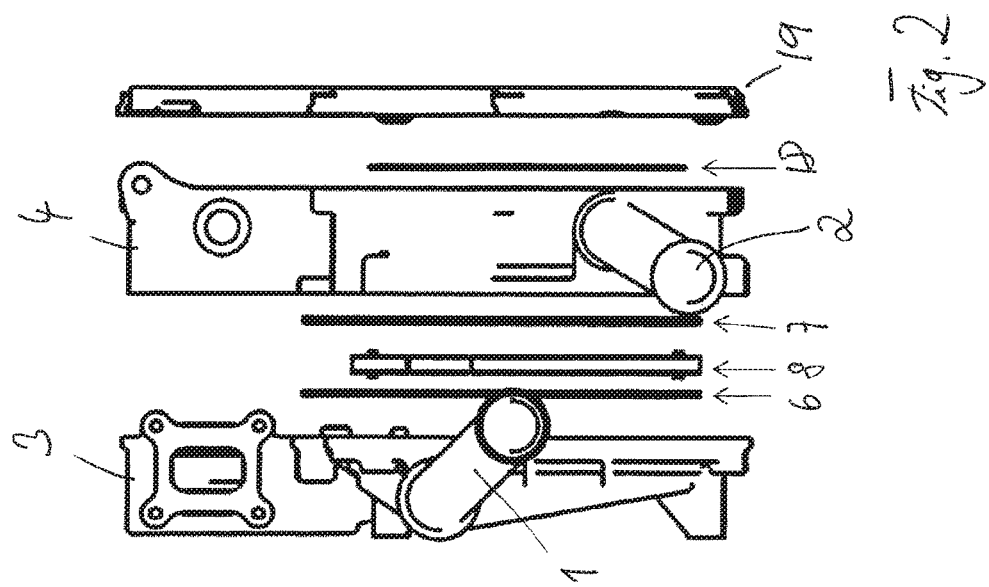
FIG. 2 shows an exploded view of the flow heater.
Figure 4:
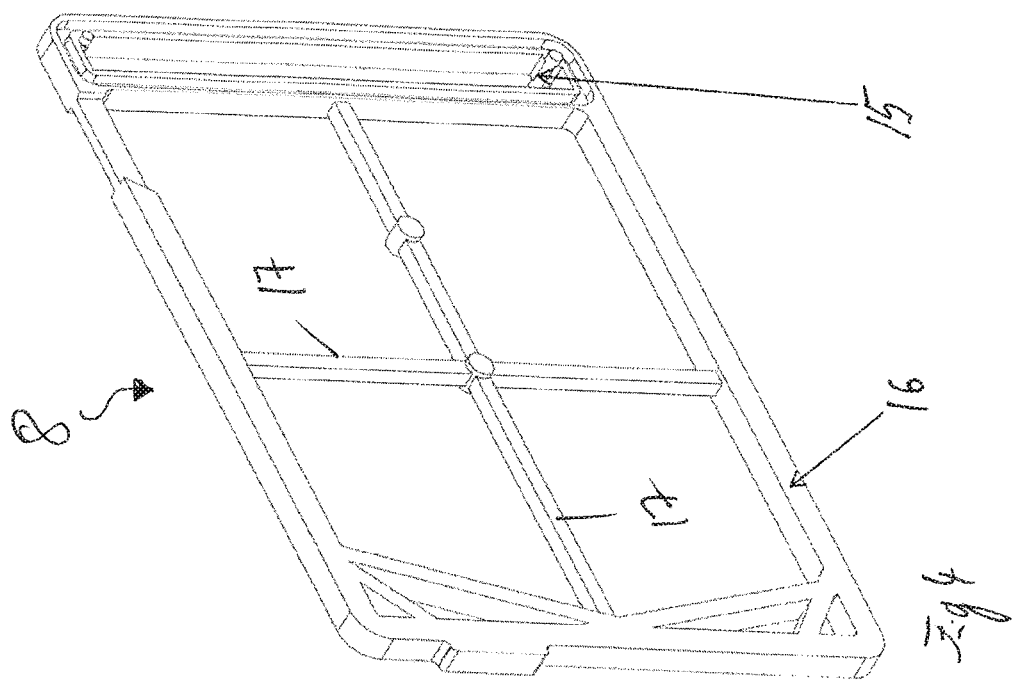
FIG. 4 shows the frame of the heating insert.

The flow heater shown in FIG. 1 in a sectional view and in FIG. 2 in an exploded view comprises a housing having an inlet 1 and an outlet 2. The housing may be formed by two housing parts 3, 4, e.g., shells. A plate shaped heating insert, which is shown in FIG. 3 in an exploded view, is arranged inside the housing. The heating insert defines a flow path 5 inside the housing so that liquid to be heated flows along both sides of the plate shaped heating insert.

The heating insert comprises a first heating plate 6, a second heating plate 7 and a plate support 8 arranged between the heating plates 6, 7. The heating plates 6, 7 may be fixed to the plate support 8, e.g., by means of an adhesive, welding or screwed fixations points, or be merely held in place by compression forces applied through the housing parts 3, 4.

Figure 5:
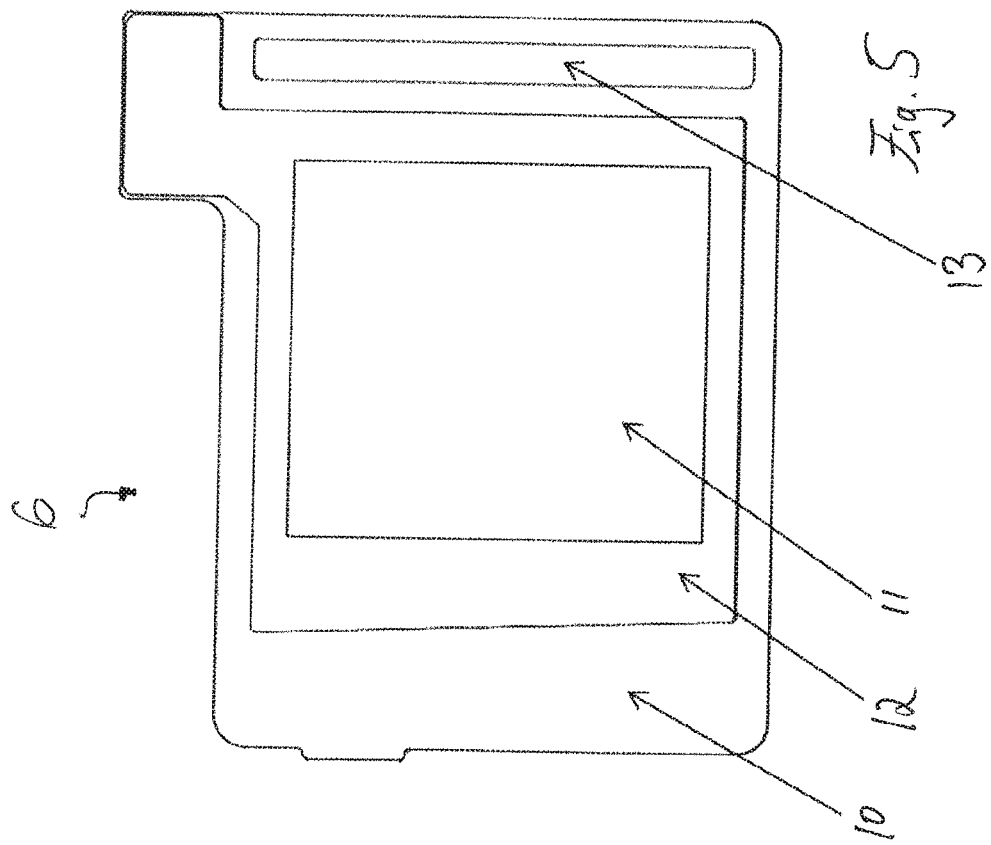
FIG. 5 shows a heating plate of the heating insert.

The heating plates 6, 7 may be equal (the same or mirror images). An embodiment of heating plate 6 is shown in FIG. 5. Each heating plate 6, 7 comprises a substrate plate 10 carrying a resistive layer 11. The substrate plate 10 may be a ceramic plate, e.g., of alumina, or a metal sheet. In the embodiment shown, the substrate plate 10 is metal sheet, e.g., of aluminum. An insulating layer 12 is arranged between the substrate plate 10 and the resistive layer 11. Thereby the metallic substrate plate 10 is electrically insulated from the resistive layer 11. Hence, the direction of heating current flowing through the resistive layer 11 is in the plane defined by the resistive layer 11, and not perpendicular to it.

The resistive layer 11 and the insulating layer 12 may be printed, e.g., as a paste or ink, or deposited by other means, e.g., vapor deposition. The resistive layer may be a PTC layer, e.g., based on barium titanate. The resistance layer 12 can be rather thin, e.g., 0.02 mm to 0.2 mm.

The heating plates 6, 7 are arranged such that their resistive layers 12 are facing each other. Thereby the resistive layer 12 is shielded by the substrate plate 10 from contact with liquid flowing along the flow path 5 through the flow heater.

The heating insert has an opening 14 (FIG. 1) through which the flow path 5 passes. Thus the flow channel has a section passing along the first heating plate 6, a connecting section passing through the opening 14, and a section passing along the second heating plate 7. The heating plates 6, 7 each have a corresponding opening 13 shown in FIG. 5.

The plate support 8 is a frame which also has a corresponding opening 15. The plate support may comprise gaskets (not shown) for sealing such that liquid passing through the opening 15 does not enter the dry space between the heating plates 6, 7.

The plate support 8 comprises a circumferential web 16 supporting the rim of the heating plates. The plate support 8 may comprise additional webs 17 for increased mechanical stability that traverse the interior space of the heating insert.

The flow heater may also comprise control electronics 18, e.g., arranged on a printed circuit board. Control electronics may be arranged on the dry side of housing part 4 and protected by a cover 19.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SIGNS

1 inlet
2 outlet
3 housing part
4 housing part
5 flow path
6 heating plate
7 heating plate
8 plate support
10 substrate plate
11 resistive layer
12 insulating layer
13 opening
14 opening
15 opening
16 web
17 web

What is claimed is:

1. A flow heater, comprising:
   a housing having an inlet and an outlet;
   a plate shaped heating insert arranged in the housing and defining a flow path from the inlet to the outlet;
   the plate shaped heating insert comprising first and second heating plates and a plate support arranged between the first and second heating plates, wherein the first and second heating plates are arranged on opposite sides of the plate support and define a dry space between the first and second heating plates, and wherein liquid flowing along the flow path contacts outward facing surfaces of the first and second heating plates; and
   the first and second heating plates each comprising a substrate plate carrying a resistive layer.

2. The flow heater according to claim 1, wherein the substrate plates of the first and second heating plates are metal plates carrying an insulating layer arranged between the resistive layer and the metal plate.

3. The flow heater according to claim 1, wherein the flow path leads from the inlet along the first heating plate and then along the second heating plate to the outlet.

4. The flow heater according to claim 1, wherein the resistive layer has a thickness of 0.2 mm or less.

5. The flow heater according to claim 1, wherein the resistive layer is a printed layer.

6. The flow heater according to claim 1, wherein the plate support is a frame.

7. The flow heater according to claim 1, wherein the heating insert is configured for electrical current to flow in a direction that is in the plane defined by the resistive layer.

8. The flow heater according to claim 1, wherein the heating insert has an opening through which the flow path leads.

9. A flow heater, comprising:
   a housing having an inlet and an outlet;
   a plate shaped heating insert arranged in the housing and defining a flow path from the inlet to the outlet;
   the plate shaped heating insert comprising first and second heating plates and a plate support arranged between the first and second heating plates, wherein the first and second heating plates are arranged on opposite sides of the plate support; and
   the first and second heating plates each comprising a substrate plate carrying a resistive layer wherein the resistive layers face one another.

* * * * *